US012705632B2

(12) United States Patent
Dorrington

(10) Patent No.: US 12,705,632 B2
(45) Date of Patent: Aug. 11, 2026

(54) METHOD FOR PREDICTIVE ANALYTICS

(71) Applicant: Anthrolytics Ltd, London (GB)

(72) Inventor: Peter Raymond Graham Dorrington, London (GB)

(73) Assignee: Anthrolytics Ltd, London (GB)

( * ) Notice: Subject to any disclaimer, the term of this patent is extended or adjusted under 35 U.S.C. 154(b) by 672 days.

(21) Appl. No.: 18/188,619

(22) Filed: Mar. 23, 2023

(65) Prior Publication Data

US 2023/0360067 A1 Nov. 9, 2023

Related U.S. Application Data

(60) Provisional application No. 63/347,734, filed on Jun. 1, 2022.

(30) Foreign Application Priority Data

May 4, 2022 (GB) ..................................... 2206488

(51) Int. Cl.
*G06Q 30/02* (2023.01)
*G06Q 30/0202* (2023.01)

(52) U.S. Cl.
CPC ................................ *G06Q 30/0202* (2013.01)

(58) Field of Classification Search
None
See application file for complete search history.

(56) References Cited

U.S. PATENT DOCUMENTS 10,224,059 B2 * 3/2019 Childress ................ G10L 25/63
11,948,577 B1 * 4/2024 Liu ..................... H04M 3/5183
2009/0306967 A1 * 12/2009 Nicolov ................. G06Q 30/02 704/9
2014/0143018 A1 * 5/2014 Nies ................... G06Q 30/0201 705/7.29
2018/0048599 A1 * 2/2018 Arghandiwal ........ H04L 51/216
2020/0205713 A1 * 7/2020 Pichon ................... A61B 5/055
2020/0342895 A1 * 10/2020 Jung ....................... G10L 15/26

OTHER PUBLICATIONS

GB Intellectual Property Office Examination Report; GB Application Serial No. GB2304013.2; Aug. 31, 2023; pp. 1-7.

* cited by examiner

*Primary Examiner* — Alan Torrico-Lopez
(74) *Attorney, Agent, or Firm* — Optimus Patents US, LLC

(57) ABSTRACT

A computer implemented method for predicting the behaviour of a population is described. The method comprising: analysing qualitative data for a transactional event encountered by at least one member of the population, to determine a topic of the qualitative data; identifying one or more emotions for the at least one member of the population associated with the qualitative data; determining a transactional event outcome for the identified emotion and associated qualitative data; assigning a score for the at least one member of the population; repeating the above steps for a plurality of events for the at least one member of the population to provide a population database; updating the score as the steps are repeated; and storing a score history and updated score in the population database; and analysing the population database and providing an output to predict the behaviour of a member of the population for new qualitative data.

20 Claims, 8 Drawing Sheets

METHOD FOR PREDICTIVE ANALYTICS

FIELD OF INVENTION

This invention relates to using new analytical techniques to identify what humans (for example, customers or employees) care about, why they care (including what they feel), how this influences their subsequent observable behaviour, and what the optimal actions are to take because of these insights. The invention is a method of understanding and predicting the behaviour of humans based on their psychological (emotional) state of mind.

BACKGROUND OF INVENTION

Statistical analysis predates the computer era and is based on finding patterns or trends within historical data to understand what happened and why—so called explanatory models. These models were then used to predict the future: for example, forecasting the likelihood or an event occurring by extrapolating a trend.

With the advent of modern computing these models increased in sophistication and power: using more data than humans can typically manage and analytical techniques that are only practicable when using the processing power of computers. 'Data science' then is the combination of large volumes of data, statistical modelling techniques, and modern computing power to develop formulae that explain the past and predict the future in probabilistic and quantitative terms.

Behavioural science is a field of study that seeks to understand how people behave and why. It can bring together a range of sub-disciplines, including Behavioural economics, Cognitive psychology, Neuroscience, and so on. Behavioural science identified the important role that feelings (beliefs, attitudes, and emotions) play in decision-making: in short, human beings are not entirely logical or rational, and much of the decision-making is influenced by emotions.

One area of study that is of relevance to Predictive analytics, is in understanding the decision-making processes that lead to an observable behaviour: why do people do what they do, and what are they likely to do next. Behavioural science can explain some aspects of the qualitative nature of human experience and behaviour. The neuroscience is clear: every decision made is a combination of logic and emotions (which is not to say that every decision is made emotionally).

Both data science and behavioural science have been used to predict human behaviour, often at the population or cohort level, but the purpose of this new form of Predictive Analytics is to combine elements of data science and behavioural science to get a more nuanced and accurate prediction of human behaviour and at the level of the individual person.

Today, predictive analytics (based on statistical modelling) uses a variety of mathematical techniques to identify the observable characteristics within a population that then helps calculate the probability that a member of that population (with those characteristics) will behave in a specific way: for example, the probability that a customer will purchase a product, or an employee will resign. The objective of predictive analytics is to outperform random selection or reliance on instinct, and the degree to which the model does so is a measure of its accuracy and predictive power. Predictive analytics can analyse very large populations, delivering probability scores for a range of outcomes for which models exist.

However, these forms of statistical models are far from 100% accurate: they may be better than random selection or 'educated guesswork' (heuristics), but still not be able to explain why two statistically identical people within a particular population respond differently when presented with the same set of circumstances. They also rely on a lot of after-the-fact data 'observations' to build and test new models, making them less useful in volatile and complex environments where data is not yet widely available.

On the other hand, behavioural science is better at explaining the motivations that drive the observable behaviour—the 'why' causing the 'what'. When faced with a person who has some pre-existing beliefs and feelings, behavioural scientists can make a prediction about the decisions that person will make and the actions they are likely to take. However, to do this, the behavioural scientist needs to know how the person is currently feeling (and why) and whilst that may be possible when in conversation with the person, it has hitherto been impossible to scale this up to large populations, and especially a particular population with whom an organisation has not been in regular discussion.

The problem facing many organisations then is this: 'how to know how everyone in a large population feels when it is impossible to be in constant dialogue with them? Because, without knowing that, the organisation can't predict how they each member of the population will respond to the actions taken by the organisation or an external stimulus'.

To address this problem, the invention is a new predictive analytical technique that combines aspects of data science with behavioural science to understand what people value and why (including what emotions they feel about those things), and the role those emotions play in their decision-making, which is then manifested in their behaviour.

The Predictive analytics of the present invention can identify when and how a person's underlying feelings have changed (even if an organisation has not been in recent discussion with them). With Predictive analytics, it focuses on the emotions that members of a population feel but acknowledge that other factors also come into play. For example, a person may 'love' a luxury brand, but if it is unaffordable, the practical economics will drive their decision not to purchase.

According to the invention there is provided a computer implemented method for predicting the behaviour of a population comprising: using a computer processor to perform the steps of: analysing qualitative data for a transactional event encountered by at least one member of the population using Natural Language Processing, to determine a topic from the qualitative data; identifying one or more emotions for the at least one member of the population associated with the qualitative data; determining a transactional event outcome for the identified emotion and associated qualitative data; assigning a score for the at least one member of the population based on the transactional event outcome; repeating the above steps for a plurality of transactional events for the at least one member of the population to provide a population history database: comprising member identification, and associated topic, emotion and event outcome; updating the score for the at least one member of the population as the steps are repeated; and storing the score history and updated score in the population history database; analysing the population history database and providing an output to predict the behaviour of a member of the population for new qualitative data.

Preferably, the steps are repeated for a plurality of members of the population. In a preferred embodiment of the invention the steps are repeated at a set frequency. Further preferably, the set frequency is one of: daily, weekly, monthly, or annually.

In a preferred embodiment of the invention, the qualitative data is a narrative. Preferably, the narrative is at least one of: a written narrative or a spoken narrative. In a further preferred embodiment of the invention the spoken narrative is received as an audio or video recording.

Preferably, the one or more emotions is explicitly stated within the qualitative data. In an alternative embodiment of the invention the one or more emotions is implicit from the qualitative data.

A preferred embodiment of the invention further comprises the step of obtaining metadata about the qualitative data.

Preferably, the one of more emotions identified are one of more of: anger, anticipation, contempt, disgust, fear, joy, love, sadness, or surprise.

In an embodiment of the invention, the qualitative data is analysed to also identify a sentiment for the qualitative data.

Further preferably, when the qualitative data from different members of the population contains common topics, the common topics are grouped for further analysis.

An embodiment of the invention further comprises the step of determining an emotional profile for at least one member of the population. Preferably, the emotional profile is determined for a plurality of members of the population.

In a preferred embodiment of the invention the steps are performed using cloud computing infrastructure.

Preferably, the method of the invention further comprising the step of determining an increase or decrease of at least one specified emotion over a defined time period. Further preferably, the time period is between 1 day-90 days.

An embodiment of the invention further comprises the step of determining the time period over which a subject will revert to a baseline emotional state.

An embodiment of the invention further comprises the step of calculating a coefficient of emotional gain, which determines the rate of absolute changes in the arousal level of a subject.

A preferred embodiment of the invention further comprises the step of determining a coefficient representing a norm for a specific subpopulation of subjects.

Preferably, the method further comprises the step of determining the priority in which a plurality of emotions for at least one member of the population are processed.

An embodiment of the invention further comprises the step of using casual inference modelling to provide a transactional event outcome that does not require analysing qualitative data for a transactional event encountered by at least one member of the population.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION

The invention is methods for combining data science with behavioural science to understand why people who make up a particular population (customers, employees, business partners, etc) do what they do and predict what they will do next, so that an organisation can take appropriate proactive or reactive actions.

The approach of this invention has two distinct phases:

Phase 1—Research and calibration: where qualitative data is analysed such as verbatim (Verbatim statements are used because the specific words that a person uses is significant in accurately detecting underlying emotions) narratives from the population (comprised of at least one subject) to be analysed (e.g., customers) for example using Natural Language Processing (NLP) software to identify what the people/narrators/members of the population are talking about (the topic or 'intent') and identifying (either explicitly stated or implied) one or more emotions for at least one member of the population associated with the qualitative data (the different topics) Preferably, the emotions comprise one or more of anger, anticipation, disgust, fear, joy, sadness, surprise, contempt and trust. The qualitative data with attached emotions is called 'Moments that Matter'. In a preferred embodiment of the invention the narrative is at least one of: a written narrative or a spoken narrative. Further preferably, the spoken narrative (verbatim) is received as an audio or video recording and then converted/transcribed into text. The narratives may be provided in real time or may be narratives that were previously recorded.

Furthermore, the analysis of combined verbatim statements with transactional (event) data allows us to identify the role of differing emotion states on significant actions taken by the subject (customer, employer, or business partners, etc.); these are called 'Business Outcomes'. For example, feelings of Anger and Distrust can be associated with some employees who resign unexpectedly (there may be other causes as well, with different emotional states). For example, business outcomes may include personnel changes, (as either employer or employee), decisions on purchasing, or choosing one product or brand over a similar alternative, etc.

Figure 1:
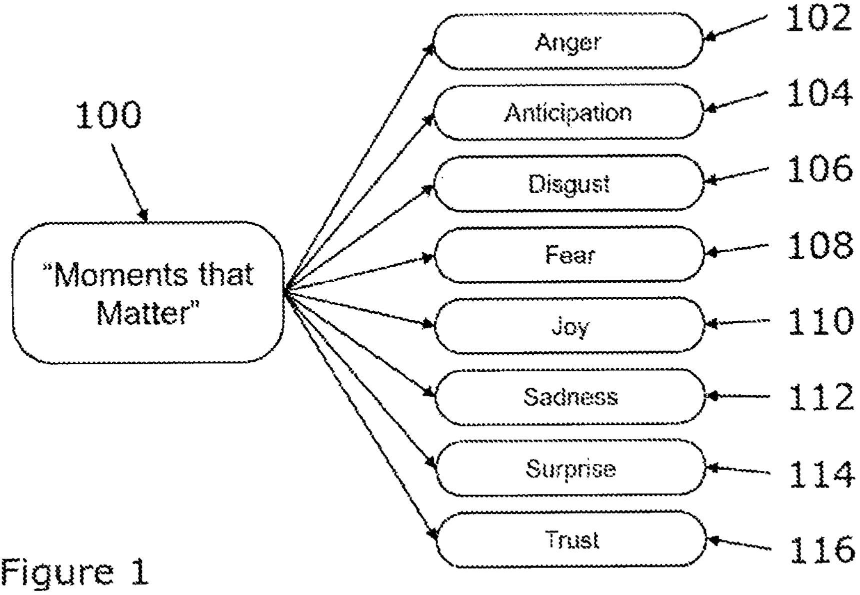
FIG. 1 shows a list of different emotions related to Moments that Matter.

So:

Moments that Matter cause emotions—See FIG. 1

Figure 2:
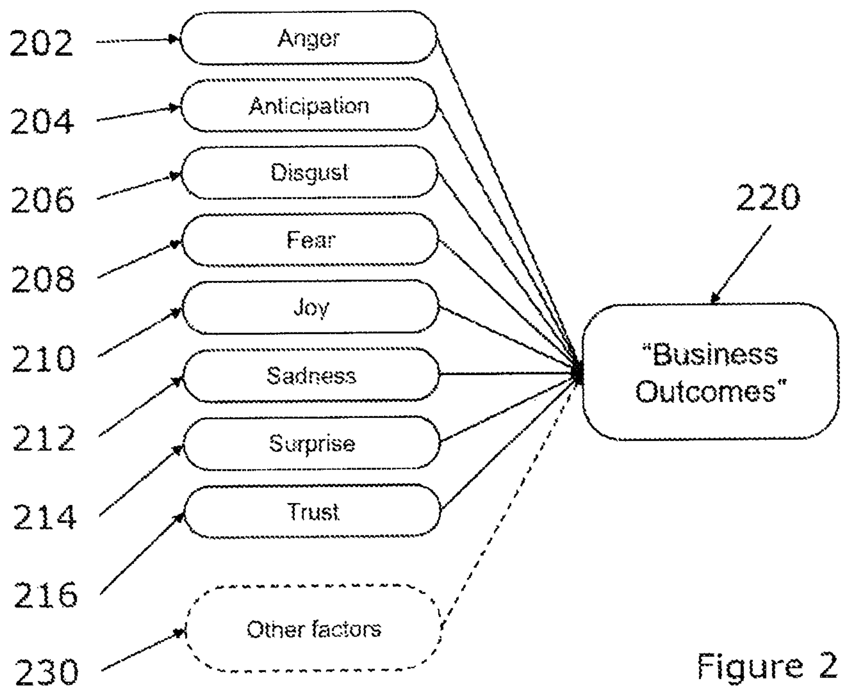
FIG. 2 shows a list of different emotions related to Business outcomes.

Emotions influence Business Outcomes (what people do)—See FIG. 2

FIG. 1 shows the different emotions that contribute to moments that matter 100. In an embodiment of the invention a moment that matters is anything that generates an emotional response of one or more simultaneous emotions. The emotions shown are anger 102, anticipation 104, disgust 106, fear 108, joy 110, sadness 112, surprise 114 and trust 116. Of course, the skilled person in the art could understand that moments that matter 100 may also result in other emotions, such as contempt, love or happiness that are not shown in this figure.

FIG. 2 shows all these different emotions anger 202, anticipation 204, disgust 206, fear 208, joy 210, sadness 212, surprise 214 and trust 216, that contribute to a business outcome 220. A business outcome is one or more observable events (behaviours) that an organisation is interested in. Also shown are 'other factors' 230, that may also contribute to the Business Outcome.

It should be noted that whilst Moments that Matter 100 may generate an emotional response, they often do not lead to an observable action, i.e., whilst the emotional state of a member of the population has changed internally, there is no external indication of this. This presents a specific problem for established predictive analytical techniques which are reliant on establishing a link between causes (e.g., Moments that Matter) and a detectable effect (e.g., an action).

Research and experience indicate that it is uncommon that a single Moment that Matters 100 for a member of the population is significant enough that it directly leads to a Business Outcome 220. Rather, it is the cumulative effect of multiple Moments that Matter 100 over an extended period that can lead to a Business Outcome 220—which is why the techniques of this invention account for personal history (experiences over time). Together with this approach, that is not solely reliant on directly observing cause-and-effect, these are fundamental differences between this new form of Predictive analytics and other analytical techniques.

Phase 2—Ongoing Operations: In which an event stream is continually analysed covering one or more members of a population for indicators that a Moment that Matters has occurred. and for which member of the population.

The emotional impact of a Moment that Matters 100 is used to increment a unique, person-specific emotional profile (consisting of a common set of emotions and their associated arousal (energy) level). In an embodiment of the invention, the emotional profile is determined for at least one member of the population. Further preferably, the emotional profile is determined for a plurality of members of the population. For example, a Moment that Matters 100 may generate feelings of surprise 114 and anger 102 both of which adds to the existing levels of Surprise and Anger for that person. In a preferred embodiment of the invention when the qualitative data from different members of the population contains common topics, the common topics are grouped for further analysis.

Individual emotions also interact with each other for a subject in the population: for example, surprise 114 magnifies the anger 102 of the Moment that Matters 100 (and any other emotions that may be caused).

The result is an incremental change in the emotional 'score' for each person in the population. Therefore, whilst it may have an initial state where every person in a database is ascribed a 'default' emotional state, they quickly diverge because of their different and individual experiences. Furthermore, subjects may experience the same events but the emotional state they are in after experiencing the events may not all be the same, due to differences in pre-existing emotional state.

The method of this invention does not require direct communication with the members of the population who are being scored and can therefore be applied to an entire database of people. This will be a population history database. The population history database comprises member identification, associated topic of qualitative data, emotion and transactional event outcome, as well as a score for each member, and a score history. Even if there are no Moments that Matter 100 for an individual in the population history database, their score can be adjusted to reflect a slow return to a default state of arousal for each emotion: for example, surprise 114 is not a long-lasting emotion and, in the absence of any other stimulus' will quickly return to a low arousal level, also high levels of happiness, will slowly return to a state of 'comfortable', or even feelings of neglect, if not further reinforced.

Moments that Matter 100 can happen at any time, and at any frequency. Therefore, the frequency of rescoring for an individual in the population history database can be adjusted to reflect the frequency of occurrence and context, but typically is done as a 'batch' daily, weekly, or monthly, or even annually. Each member of the population is scored individually, and not as a part of a segment or set, until they are assigned to an Empagraphic segment, based on their new emotional state.

As well as a basic scoring mechanism (emotions before and after the Moments that Matter 100), the scoring mechanism can also consider such things as 'coefficients' including modifying coefficients that can measure emotion attack or decay, a coefficient of emotional drift, a coefficient of emotional gain, a coefficient of emotional personae, a coefficient for cultural or social norms and a coefficient of emotional dominance. These are described in more detail later in this document.

The output of the new Predictive analytics is typically a data file of updated emotions per person scored that can be ingested by an organisation, but it can also be augmented with other data (for example, Recency, Frequency, and Monetary Value (RFM) transactional data) to produce predictive models (for example, of churn, propensity to purchase, etc.). The output may also include a report or display information for example.

Finally, it is acknowledged that emotions and prior experience (history) are only two factors that go into the decision-making process that ultimately results in a person taking an (observable) action. Other factors include rational 'needs', the external influences of third parties and society, and the internal biases based on faulty logic and heuristics—see FIG. 3.

Figure 3:
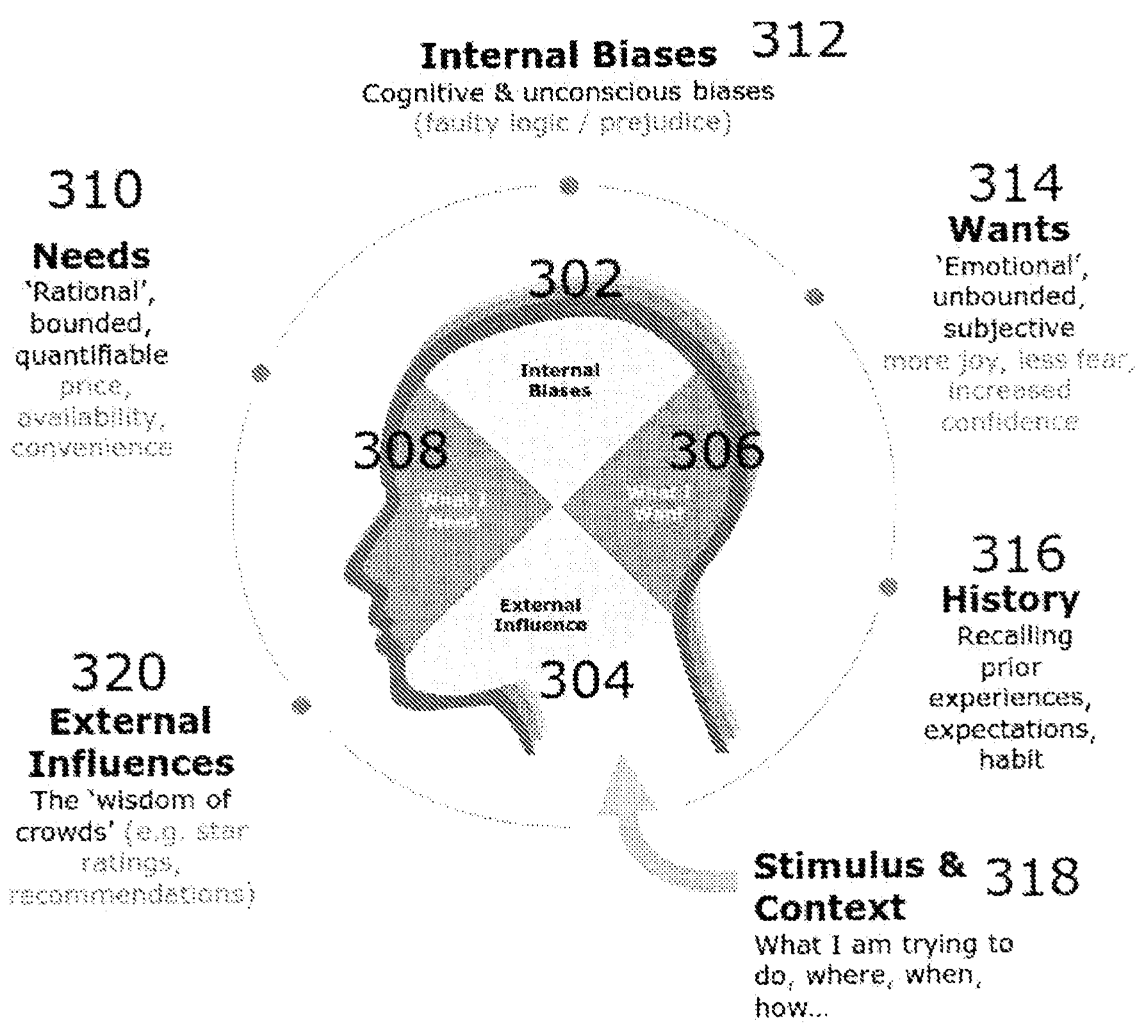
FIG. 3 shows different biases and needs and wants that may affect an individual.

FIG. 3 shows an outline of the decision-making factors of a subject 300, who may be part of the population that is being studied. The new analytical technique of this invention recognises that there are several factors that can lead to a member of the population changing their feelings, beliefs or attitudes and the resultant behaviours that they then go on to display.

The subject may have internal biases or heuristics 302, be subject to external influences 304, feel what they want 306 and know what they need 308. Example needs are shown at 310, internal biases are shown in more detail at 312, 'emotional' wants are described at 314, a reflection of their personal history is 316, stimulus and context (what they are trying to achieve and how) at 318 and considering external influences at 320.

All these factors go into how humans make decisions, including those that are manifested as behaviour, but not always consciously considered. The invention's predictive analysis techniques take this into account, especially the unconscious effect of emotions.

Figure 4:
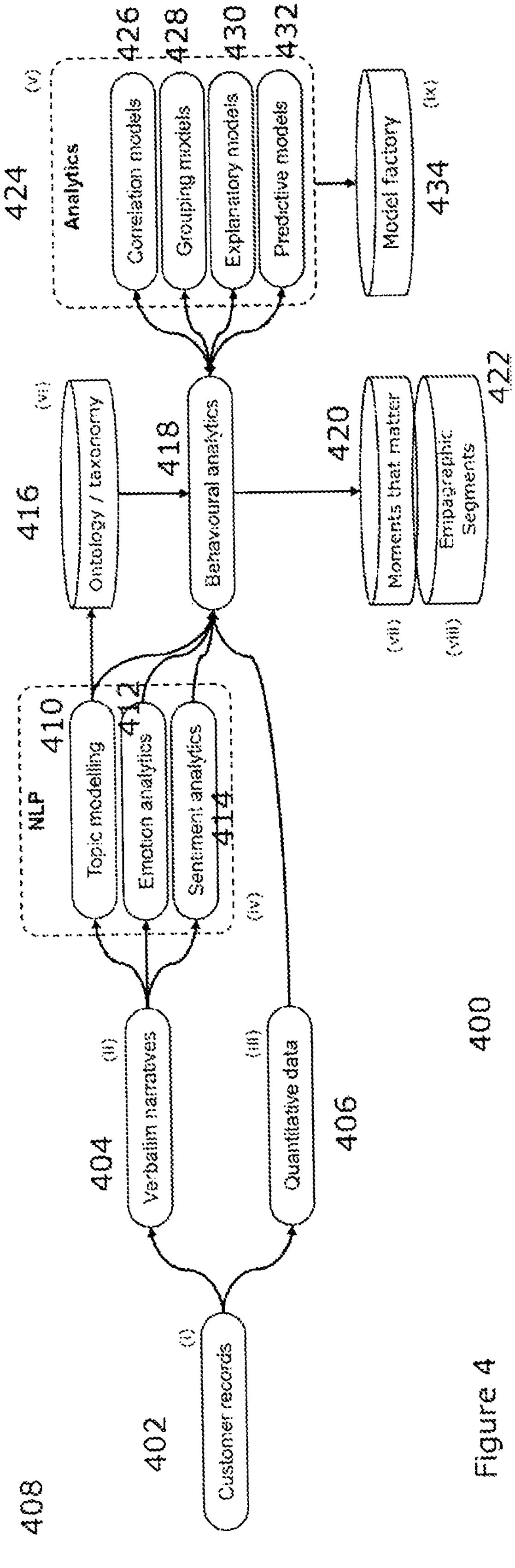
FIG. 4 shows how customer records are received stored and analysed.

A preferred embodiment of the Predictive Analytics process is given below . . . . FIG. 4 shows how the customer records are received and analysed as a data flow diagram. This figure represents the flow of data through the first process (calibration) that identifies what people care about, why, and the emotions they feel as a result.

Data Discovery

First, customer records 402 are received and stored in a population history database. Then, one or more sources of verbatim qualitative data 404 and transactional data 406 are identified in the customer records, that have the potential to be linked to both 'Moments that Matter 100' and 'Business Outcomes' 200.

In the absence of sufficient verbatim or quantitative data, it is possible to use other techniques to form the initial hypothesis: for example, Causal Inference modelling; where probabilities are assigned for the effect of each Moment that Matters 100 or Business Outcome 220 based on experience or other analysis, these can then be tested statistically as more data becomes available and refined accordingly. In an embodiment of the invention casual inference modelling is used to provide a transactional event outcome that does not require analysing qualitative data for a transactional event encountered by at least one member of the population.

Phase 1—Research & Calibration

1. Ingest Data from Client

Customer (or employee) records 402 are received from a client, preferably via a secure mechanism (& preferably in a standardised template) and preferably are stored in a secure population history database and consisting of one or more of:

- qualitative data—404. Preferably, the qualitative data is verbatim narrative data, where the verbatim data 404 is at least one of: a written narrative or a spoken narrative.

invention the emotions my comprise one or more of anger, anticipation, contempt, disgust, fear, joy, love, sadness, or surprise. In an embodiment of the invention, the narrative data is analysed to identify a sentiment 414 for the qualitative data, although this is not used for the operational/scoring phase.

- Analytics 424 for example, comprising correlation models 426, grouping models 428, explanatory models 430 and predictive models 432. Grouping algorithms 428 are used to identify common topic features ('intents'). i.e., when a topic appears in multiple verbatim narratives 404 (this can include common synonyms): for example, "long queues" may appear in multiple verbatim narratives 404 describing a retail experience.

A Preferred Feature of an embodiment of the invention, is the development and use of context-specific ontologies/taxonomies 416: for example, an industry taxonomy for Banking, or a cultural taxonomy for native English speakers.

- Correlation algorithms 426, within the analytics 424 are then used to identify common emotions (and their arousal levels) associated with each topic: for example, "Anger" and "Disgust" appear in many of the statements that also mention "long queues". In a preferred embodiment of the invention the one or more emotions will be explicit from the qualitative data 404. In an alternative embodiment of the invention, the one or more emotions is implicit from the qualitative data.

Research shows that the Plutchik set of universal emotions are the most useful in describing Moments that Matter 100 and Business Outcomes 220, but other models of universal emotions can be used at a client's discretion—for example:

TABLE 1 table of possible emotions

| Plutchik: | Anger | Anticipation | (Anger + Disgust) | Disgust | Fear | Joy | (Joy + Trust) | Sadness | Surprise | Trust |
|---|---|---|---|---|---|---|---|---|---|---|
| Ekman: | Anger | | Contempt | Disgust | Fear | Joy | | Sadness | Surprise | |
| Parrott: | Anger | | | | Fear | Joy | Love | Sadness | Surprise | |

Further preferably, the spoken narrative is received as an audio or video recording.

- Quantitative (transactional/event) data 406. This may include details of an event, or a sale or other transaction involving the client.

The following Preferred Features enhance the usability of at least one of the verbatim data 404 and the quantitative data 406:

- Data Quality Management 620, in which errors, duplications or omissions in the verbatim 404 and/or quantitative data 406 are resolved.
- Formal Data Management, in which metadata (data about data) about the verbatim 404 or qualitative data and/or quantitative data 406 is generated and changes to the verbatim 404 and/or quantitative data 406 recorded and audited. Examples of such metadata include, when the data was received, any changes made because of Data Quality Management, when the data was superseded, etc.

2. Analysis

The verbatim narrative data 404 is parsed for one or more of topics, emotions, and sentiment, using Natural Language Processing (NLP) software 408. Topics 410, detected emotions 412 and sentiment analytics 414 are assigned to each verbatim narrative 404. In a preferred embodiment of the

- Each topic that can be associated with a one or more emotions caused is then stored as a 'Moment that Matters'—420
- Further grouping analysis is used to identify cohorts of people who share similar emotional states (these are called "Empagraphic Segments") 422

The Quantitative (transactional) data 406, in conjunction with the verbatim data 404 is then analysed to identify Business Outcomes (a transactional event outcome) 220 and any emotions associated with the transactional event outcome: For example, a customer who cancels an account who displays feelings of Anger and Disgust.

Using predictive analytical techniques 424, models are developed (correlation model 426, grouping model 428), explanatory model 430 and predictive model 432) that can identify relationships within historic verbatim narrative data 404 and/or quantitative data 406, (explanatory models 430) and extrapolate these models into predictive/probability models which can be stored in a 'model factory' 434 for use in the operational phase (Phase 2)

3. Return on Investment Calculator/Dashboards

At this stage, some or all of the data about the emotional profile of every member of the population analysed (each member of the particular population) can be made available to third-party reporting tools to create reports and dashboards illustrating the emotional states of different cohorts/Empagraphic segments (which can then be tracked over time).

Initial State Creation—Setting an Initial Emotional State for all Customers

Using the analytical products from Phase 1, an initial emotional state can be assigned to every person within the population to be analysed based upon known history/circumstances to date. For example, every new customer may be assigned an initial 'neutral' emotional state—neither positive or negative, highly emotional, or unemotional.

Figure 5:
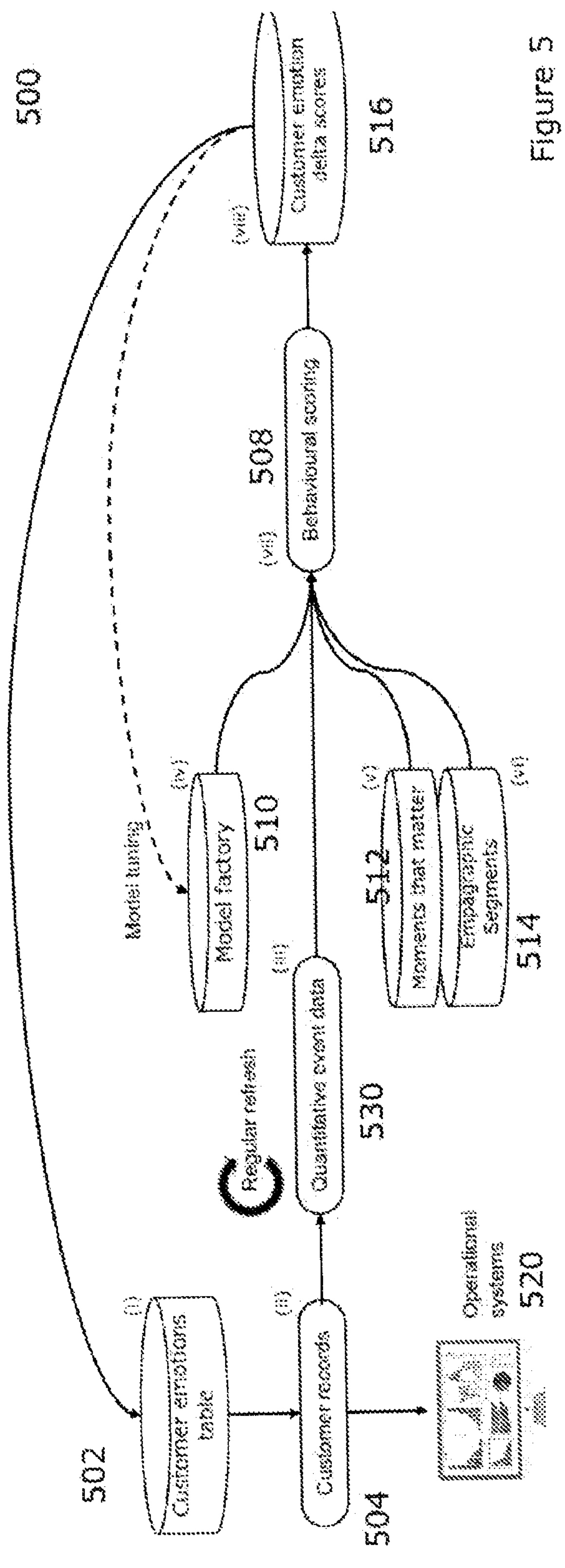
FIG. 5 shows different stages of analysis of the customer data.

FIG. 5 shows the stages involved in this part of the method. This figure represents the data flow through the invention's new predictive analytics scoring process (operations). It is a cyclical process that repeats at a period appropriate to the needs of the organisation (e.g., daily, weekly, monthly, or even annually etc.). As shown, 'Customer Emotions Table' 502 may be appended to any existing Customer Data Platform (CDP). The same is true for other populations (for example, employees, suppliers, business partners, etc.)

The Customer Emotions Table 502 is maintained so that every record within it can be updated whenever any additional Moment that Matters has occurred for a specific person within the population.

At this stage, it is unlikely that any single Moment that Matters 100 directly causes a Business Outcome 202, which is why the operational phase is deliberately designed to consider the cumulative effect of multiple Moments that Matter 100 that lead up to a Business Outcome 220.

Phase 2—Ongoing Operations

For every client, a frequency of update of the population database and the associated reports is agreed (for example, daily, weekly, monthly, or annually) that reflects the volatility and complexity of the verbatim narrative data 404 and/or the quantitative data 406.

For each defined time period (daily/weekly/monthly/annually): Ingest the Event stream (Moments that Matter× unique Customer record 504) from client. The customer records 504 will ultimately be output to an operational system 520, which can display reports or other information that has been extracted from the customer records and/or the customer emotions table 502. For every Moment that Matters (drawn from the quantitative event data 530), the method will identify the affected people of the specific population in the Customer Emotions Table 502. For each affected person, the method will then calculate new emotions state scores, and may also Load the previous day's emotional state for that customer from the Customer Emotions Table. The method will then calculate coefficient of delta emotion (how much the emotion has changed), via behavioural scoring 508 for each emotion in turn. This involves using models from the model factory 510, data from The Moments that Matter table 512, and the empagraphic segmentation 514.

The impact of other emotional coefficients not shown in FIG. 5 (e.g., regional, industry, etc.—Preferred Features)

For example (and simplistically), Person X was 80% Happy yesterday and a Moment that Matters 100 has occurred to this person that would normally make them 10% happier BUT as they approach maximum happiness, the impact of individual emotions is attenuated with a net result of the change in happiness being only 5%.

For each emotion:

Recalculate a delta emotional state 516=previous emotional state+(coefficients*Moments that Matter Delta emotions)

Calculate 'emotional disposition' based on the cartesian mean of positive and negative emotions, where 'emotional disposition' is a single number on a linear scale (from negative to positive) that summarises the total effect of all the positive and negative emotions and how strongly each is felt.

Calculate 'receptivity' (positive—negative emotions: or Receptive, Ambivalent, Churn Risk)

If necessary, reassign a new 'empagraphic segment' 514. Linked to emotional disposition, 'receptivity' is a measure of how responsive a person will be to a communication from the organisation (for example, a marketing offer)

Then save the new scores for each member of the population as new emotional state & empagraphic segment for that customer in the customer emotions table 502.

Send Updated Emotional States to Client (Customer IDs× New Emotional State)

Either by direct transmission to the client, or storing in secure, client-accessible location—an emotional score is provided for every person, using their unique ID.

Dashboard

Add each customer's or employee's current emotional state to a longitudinal database. Generate a dashboard of historic changes in each emotion/receptivity/sentiment over time.

Phase 3—Modelling Services

For some clients, that have limited data science capabilities, the method of this invention can provide predictive models that combine the Customer Emotions Table 502 with Quantitative data 506 to predict specific Business Outcomes 220; for example, a person's propensity to purchase, or probability of churn.

This is done by developing Empagraphic Segments 514 that have upper and lower thresholds for key emotions (for example for Anger or Joy) and Quantitative data 506 (such as date of last purchase, historic spending patterns, etc.). For example, using this method, it can be determined that cohorts of people who strongly feel the same emotions will have a propensity to perform an action related to a Business outcome 220; the more strongly they feel these emotions, the more likely it is that they will perform the action. A 'threshold' can be set where a predicted percentage of people will perform the action (for example, 50 percent), based on the strength of their feelings. However, the organisation can choose to intervene and take a proactive action at a different threshold—anticipating the future performance of both positive and negative Business outcomes 220.

Figure 6:
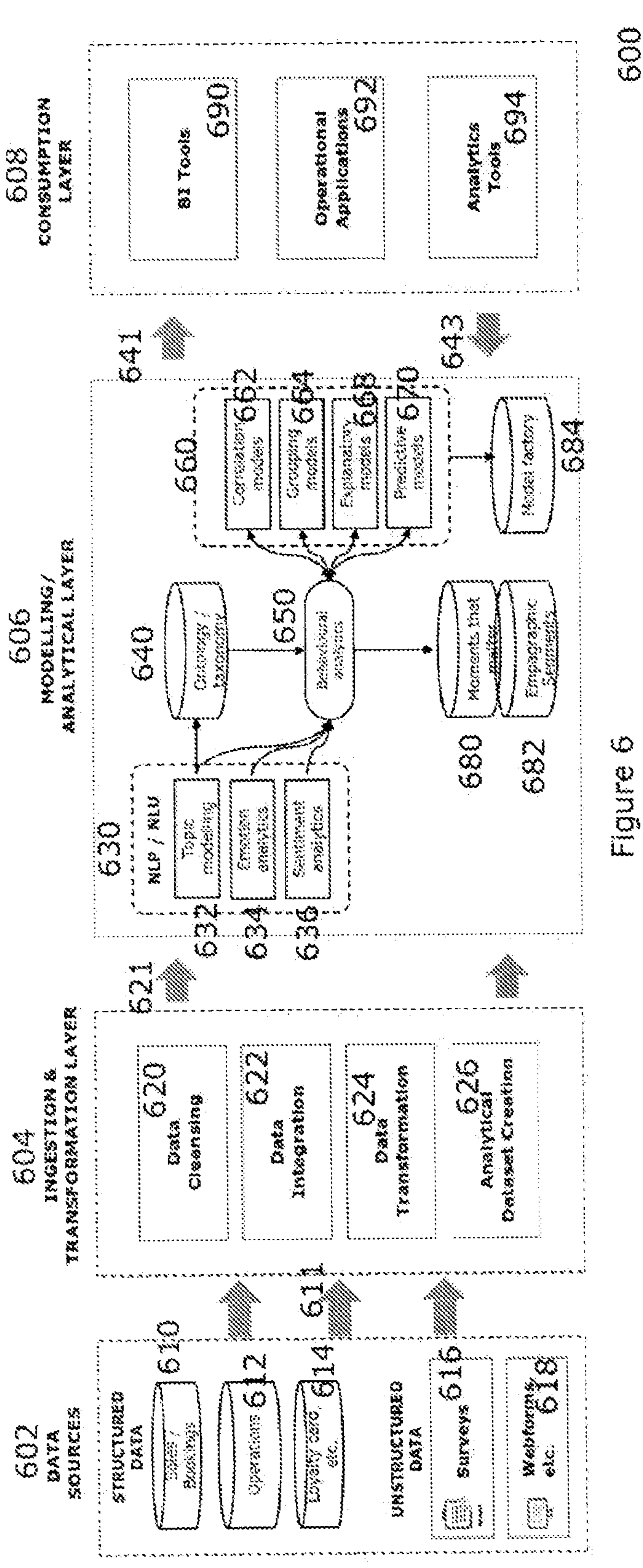
FIG. 6 shows various and typical architectural features of the analysis and processing

FIG. 6 shows how data is received and processed according to an embodiment of the invention. This figure shows various and typical architectural features of the analysis and processing engine at the heart of this new predictive analytics technique The overall structure of the method is show at 600. As shown, there is a data source layer 602. This comprises structured data and unstructured data. The structured data comprises one or more of, for example, sales/booking information 610, operations information 612, loyalty card information 614. Of course, in certain embodiments of the invention there may be other types of structured data that is not shown in the figure. The unstructured data preferably comprises one or more survey data 616 and webforms 618, but may also include transcripts, recordings and so on. Again, in certain embodiments of the invention there may be other types of structured data that is not shown in the figure. At step 611 information from the data sources 602 is passed to an ingestion and information layer 604. This may be one set of information from the data sources, or it may be two or more sets of information from different data sources. In addition, it may be only information from the structured data, or only information from the unstructured data, or a mixture of structured and unstructured data.

The ingestion and information layer 604 preferably comprises a data cleansing step 620—where errors and omissions are resolved and data is normalised, data integration step 622—where data is combined, data transformation step 624—where data is reformatted or inferred for analysis (e.g., age calculated from the current date and date of birth) and an analytical dataset created step 626—where the data is prepared for specific analytical processes. Information is passed from the ingestion and transformation layer 604 to the modelling and analytical layer 606 at step 621.

The modelling and analytical layer 606 comprises a Natural Language Processing/Natural Language Understanding (NLP/NLU) module 630, that generates an ontology and taxonomy table 640, and then passes textual analyses to the behavioural analytics module 650, which in turn generates a moments that matter table 680, and empagraphic segments table 682, which are used by the analytics module 660 which stores predictive models in the model factory 684. In a preferred embodiment of the invention the NLP/NLU module 630 comprises a topic modelling module 632, an emotion analytics module 634 and sentiment analytics module 636. The analytics module comprises correlation modelling 662, grouping modelling 664, explanatory modelling 668 and predictive modelling 670. The topic modelling module 632 from the NLP/NLU module 630 can provide input to the ontology/taxonomy table 640, and all the modules for the NLP/NLU module 630 can provide input to the behaviour analytics module 650.

As shown, an output of the behaviour analytics module 650 can be provided to the moments that matter table 680, as well as to all the modules that comprises the analytics module 660. An output (predictive models) from the analytics module 660 can be provided to the model factory 684.

At step 641 emotions data output from the modelling/analytical layer 606 is provided to the consumption layer 608. Preferably the consumption layer 608 comprises a Business Intelligence (BI) tool module 690, operational applications/programs 692 and other analytic tools 684. An output from the consumption layer 608, is provided back to the modelling analytics layer 606 via a data link 643.

Figure 7:
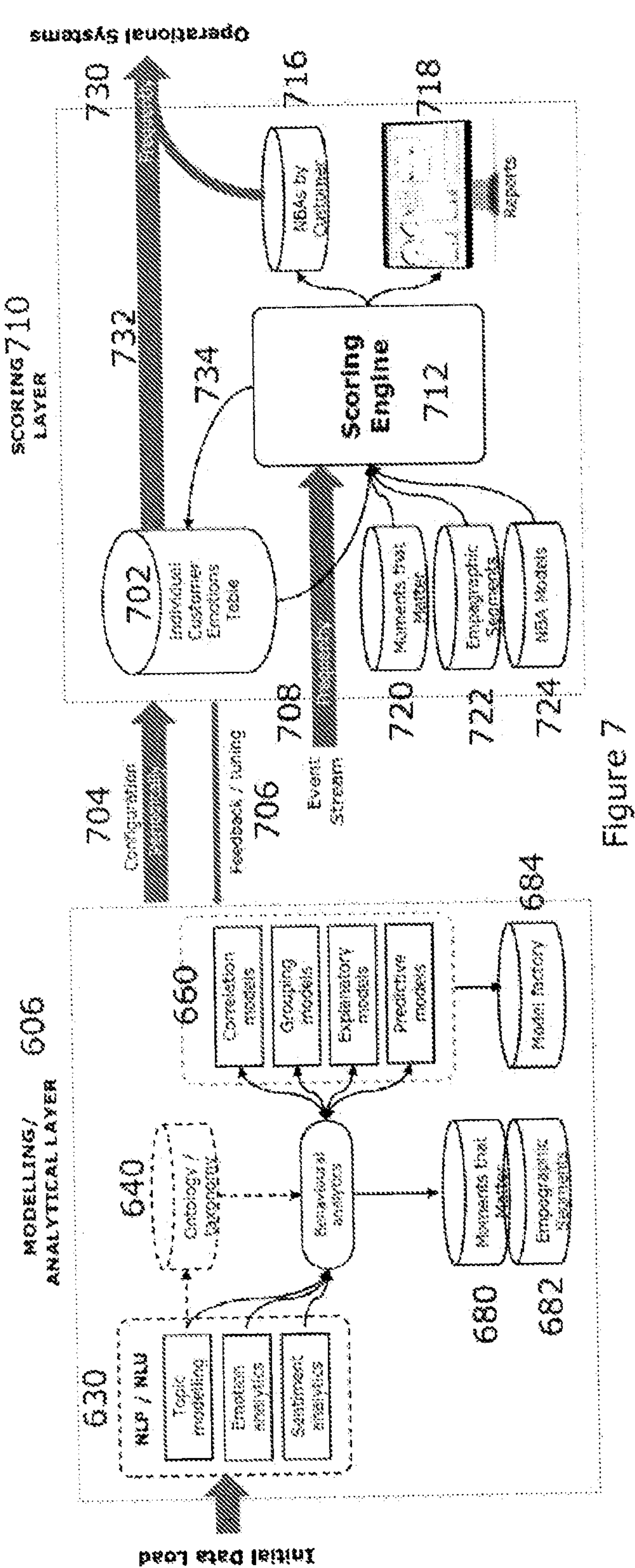
FIG. 7 shows a graphical representation of the modelling and scoring layers in more detail.

FIG. 7 shows an outline 700 of the modelling analytical layer 606 of FIG. 6, connected to a scoring layer 710. FIG. 7 shows a graphical representation of the new predictive analytics technique and used to predict a Next Best Action 716 for each customer to be contacted, via the organisation's operational systems.

As shown, the modelling and analytical layer 606 comprises a NLP/NLU module 630, ontology and taxonomy table 640, a behavioural analytics modelling module 650, moments that matter table 680, empagraphic segment table 682, and an analytics module 660 providing predictive models to the model factory table 684. These have already been described with reference to FIG. 6. As shown, data is received at step 702 from the modelling/analytical layer 606 and processed as described above. At step 704 periodic configuration data is provided between the modelling/analytical layer 606 and a scoring layer 710. At step 706, feedback about the performance of the models (results) is provided to the Modelling/analytical layer to fine tune and refine the predictive models.

In the modelling and analytical layer 606, Organizational data is initially processed using Natural Language Processing/Understanding 630 to identify topics (things people care about), how they feel about those topics and their overall sentiment. It can also be used to generate a context-specific ontology or taxonomy table of specific words and phrases 640.

Using this data, the new predictive analysis technique identifies Moments that Matter 680 and cohorts of customers with similar sets of emotions 'Empagraphic segments' 682. This data is then processed using traditional data science techniques 660 to generate models of behaviour for each empagraphic segment that are stored in a 'model factory' 684.

In the operational scoring layer 710, the results of the modelling and analytical layer 606 are used to evaluate a stream of event data 708 from the organisation, specifically it evaluates any event that is correlated to a Moment that matters 680 during the previous phase 606, updates the emotional state of every affected person, assigns the person to one of the predetermined Empagraphic segments 722 and selects the Next best action to take 724 which is then provided to the operational systems 730 for action. The predictive analysis data, including historical data, is also made available for business reporting 718.

The scoring layer 710 comprises an emotions table 702, a scoring engine 712, customer NBA table 716, and generates data 718 for reports, as well as retrieves data from the moments that matter table 720, empagraphic segment table 722 and NBA models 724. An output from the emotion table 702 to an operational system 730 is provided via a data link 732. An event stream 708 provides inputs to the scoring engine 712 which also receives input from the moments that matter table 720, empagraphic segment table 722 and NBA models 724. The scoring engine 714 provides input to the emotions table at 734, as well as providing output to the customer NBA 716 and provides data for reporting (for example, via an online dashboard) 718.

Figure 8:
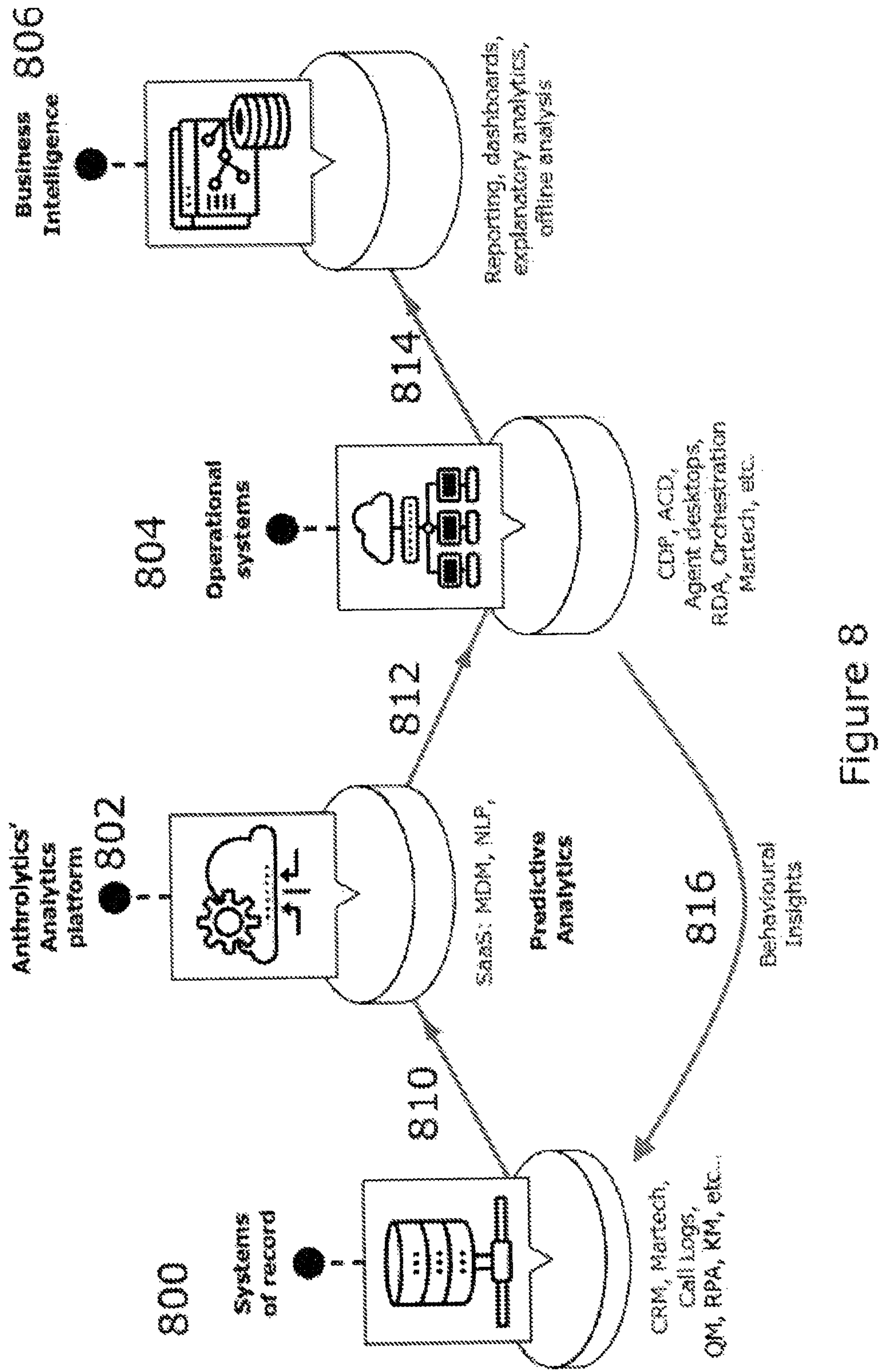
FIG. 8 shows a much-simplified version of FIG. 7 and shows examples of the types of data.

FIG. 8 shows a much-simplified version of FIG. 7 and shows examples of the types of data/systems that are encompassed by the technique as deployed in a call centre context. As shown, data is extracted from 'systems of record' 800—such as Customer Relationship Management (CRM), Marketing Technology Platforms (Martech), Call Logging, Quality Management (QM), Robotic Process Automation (RPA) and knowledge management (KM) systems.

An analysis platform 802, which performs the methods as shown in FIG. 6 and FIG. 7, offered as 'Software as a Service (SaaS), and including such functions as Master Data Management (MDM) and Natural Language Processing (NLP).

Results are passed to operation systems 804 and a business intelligence module 806.

At 810 the data from the systems of record 800 is provided to the analysis platform 802 via a secure data link and an output from the analysis platform 802 is provided to the operational systems 804 also via a data link 812. Further, behaviour insights are provided via 816 from the operational system 804 back to the records system 800 (for example, recording what actions were taken for which persons). In a call centre example, the operational system 804 can comprise a Customer Data Platform (CDP), an Automated Call Dialler (ACD), Agent desktops, Robotic Desktop Automation (RDA), Orchestration of Marketing Technology (Martech), etc. . . . .

Figures 9A, 9B:
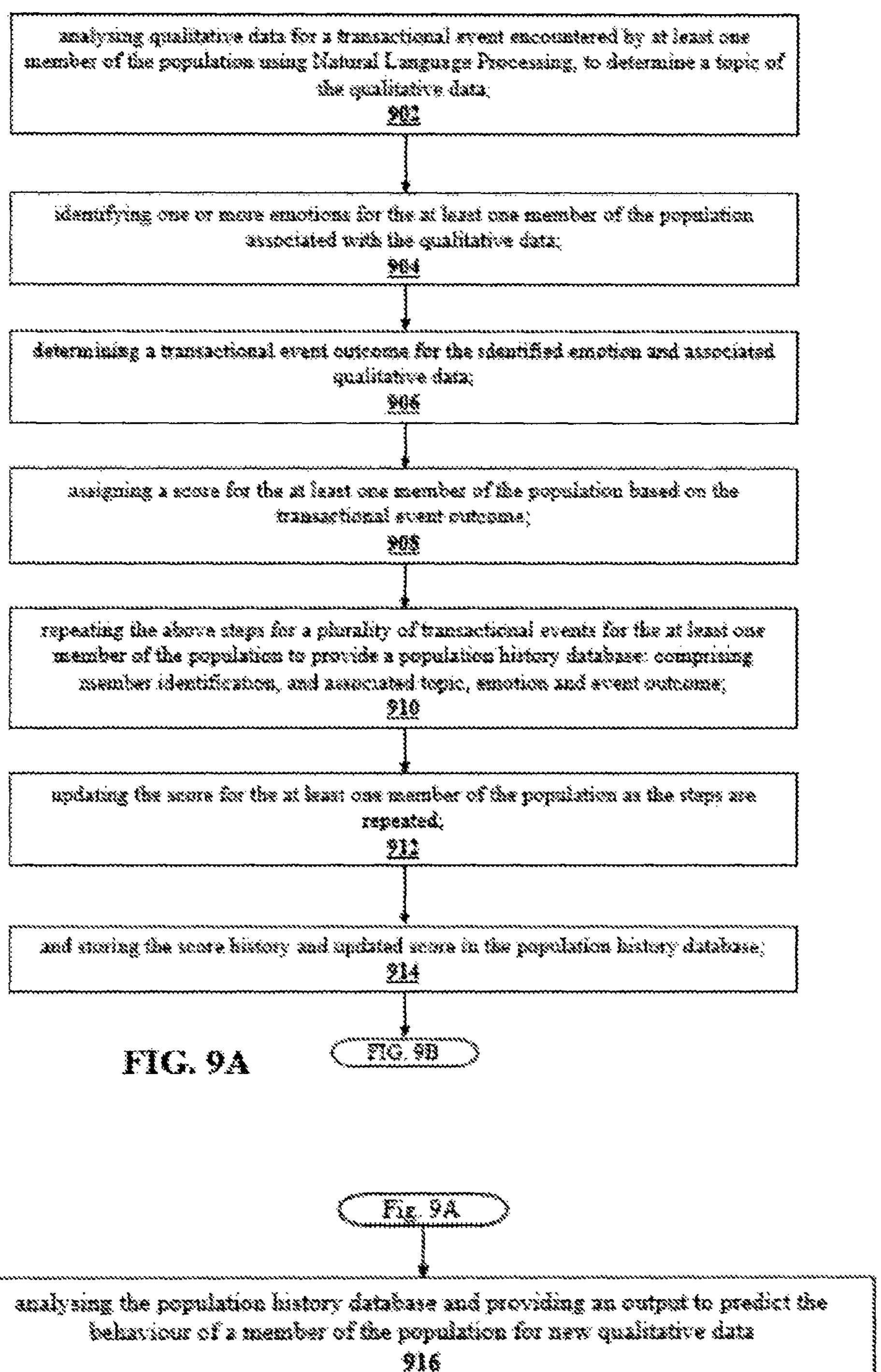
FIG. 9(*a*) and FIG. 9(*b*) show a flow chart for a method according to an embodiment of the invention.

FIGS. 9(*a*) and (*b*) is a flowchart of an example process 900 for an example of the invention. In some implementations, one or more process blocks of FIG. 9 may be performed by a device. In some cases some steps of the method may be performed by a cloud computing system. In other cases, one or more steps of the method may be performed by a stand-alone computer system. As shown in FIG. 9, process 900 may include using a computer processor to perform the steps of:

analysing qualitative data for a transactional event encountered by at least one member of the population using Natural Language Processing, to determine a topic of the qualitative data 902;

Identifying one or more emotions for the at least one member of the population associated with the qualitative data 904;

determining a transactional event outcome for the identified emotion and associated qualitative data 906;

assigning a score for the at least one member of the population based on the transactional event outcome 908;

repeating the above steps for a plurality of transactional events for the at least one member of the population to provide a population history database: having member identification, and associated topic, emotion and event outcome 910;

updating the score for the at least one member of the population as the steps are repeated 912; and storing the score history and updated score in the population history database 914;

analysing the population history database and providing an output to predict the behaviour of a member of the population for new qualitative data 916.

For example, device may use a computer processor to perform the steps of: analysing qualitative data for a transactional event encountered by at least one member of the population using natural language processing, to determine a topic of the qualitative data; identifying one or more emotions for the at least one member of the population associated with the qualitative data; determining a transactional event outcome for the identified emotion and associated qualitative data; assigning a score for the at least one member of the population based on the transactional event outcome; repeating the above steps for a plurality of transactional events for the at least one member of the population to provide a population history database: having member identification, and associated topic, emotion and event outcome; updating the score for the at least one member of the population as the steps are repeated; and storing the score history and updated score in the population history database; analysing the population history database and providing an output to predict the behaviour of a member of the population for new qualitative data, as described above.

Although FIG. 9 shows example blocks of process 900, in some implementations, process 900 may include additional blocks, fewer blocks, different blocks, or differently arranged blocks than those depicted in FIG. 9. Additionally, or alternatively, two or more of the blocks of process 900 may be performed in parallel.

Identify Dependent Variables (Business Outcomes) to be Predicted

Ingest known independent (explanatory) quantitative variables (if available) for each dependent variable (the Business Outcome to be explained) and then, for each dependent variable:

Use predictive analytics with independent variables+emotional state scores (derived from the Modelling/Analytics Layer 606 to develop a predictive model for each outcome.

Check the model for accuracy using training/evaluation data (where the ingested data is split into three groups: data from which the model learns, data with known outcomes against which the model can be tested (it should be able to correctly predict the outcome of the validation data set) and a control group held in reserve for comparison.

The best (most predictive) models are then saved in the 'model factory' and make accessible/usable to clients (e.g., a default 'upsell model' or 'likelihood of churn').

There are lots of Natural Language Processing (NLP) software packages that can detect emotions and that are widely used in business. However, they only work on direct communications between the organisation and the subject person. This normally accounts for a very small percentage of the total number of customer or employees etc.

This unique solution uses these small number of discussions (verbatim data 404) to identify what people care about (the topic or 'intent') and why (both emotional and 'rational') this data is used to extrapolate these emotional states to the whole database population.

However, of itself, this is not enough to build a predictive model of behaviour 432, because each person's emotional response reflects their personal experiences (history) up to that point. Simply put, the impact of any given Moment that Matters 420 reflects how the affected person already feels.

Many organisations have tried to build deterministic models of behaviour and failed, largely because of the complexity and number of independent (explanatory) variables that would need to be considered; the volume of data and computing power required to run traditional, or AI based models is simply too great.

The present approach is different, as it scores every customer (member of the population) frequently (daily/weekly/monthly/annually) on how they felt before, what has happened to them since (and what they are likely to feel about that) and how that impacts their emotional outlook now.

For Predictive Behavioural Analytics to work, the following are needed:

A way to receive, store and return quantitative and qualitative data.

An NLP engine that can identify topics, emotions, (and sentiment).

Statistical analysis software and models for grouping, correlating, and predicting data trends (i.e., find hidden patterns and trends within large datasets).

A scoring mechanism 508 that can recalculate customer emotions at speed, including the effect of any modifying coefficients.

In practice, an emotional profile can be assigned to every customer, employee, etc. irrespective of whether the organisation has been in direct conversation with them recently or not. Therefore, this solution is not dependent on constantly surveying people to find out what they are feeling.

This solution also allows us to address questions like "If my organisation does something that we know affected customers won't like (established through research), can you tell how likely is it that they will defect?" the answer being "it depends upon how they feel about you now: if they love you (strongly positive disposition), they will probably forgive you, but if they hate you (strongly negative disposition), this may be the final act that destroys the relationship".

In preferred embodiments of the invention there is also provided: Data Quality Management and Data Management for data received from the client organisation.

Sentiment Analysis—whilst not required for the invention's Predictive analytics, it is a commonly used (and requested) output from Natural Language Processing and provides an opportunity to highlight potential challenges or opportunities to improve disposition.

Modifying Coefficients: the following features can be used to improve accuracy and applicability of the individual emotional score for each individual:

Emotion attack/decay (how much individual emotions, increase/decrease over time) These are time-dependent coefficients that take into account that emotions associated with Moments that Matter are not simply on or off: Once the stimulus (e.g. Moment that Matters) occurs, it takes time for the emotion to reach its peak arousal level (attack), once it achieves its peak, it may drop in intensity, even though the stimulus is still there (decay), the emotional intensity may stabilise for the duration of the stimulus being present (sustained), before beginning to diminish after the stimulus has ended (released). The invention offers a unique way of taking this into account, without having to directly observe the subject person.

Emotional drift (how quickly a person will drift towards a predicted state in the absence of other stimuli (i.e., Moments that Matter)

Experience shows that even when there is no emotional stimulus, and in the absence of any other stimulus, a person's emotional state will begin to drift back towards their nominal comfort level (for example, I may be angry today, but I will be slightly less angry tomorrow, a little less the day after, and so on). The invention offers a unique way of taking this into account, even when no observable Moments that Matter have occurred (because we do not need to observe an action (effect) to identify a cause (e.g., Moment that Matters).

Coefficient of Emotional Gain (e.g., absolute changes in arousal level change as they approach extremes). As a person approaches minimum or maximum arousal (emotional intensity) they may become less responsive (in absolute terms) to a stimulus. For example, it takes much more energy to lift a person from delighted to ecstatic, than from happy to delighted.

Emotional Personae (representing emotional sensitivity as a function of non-emotional attributes)

(Also linked to Empagraphic Segmentation) different personality types are more or less sensitive to the same emotional stimuli than others; for example, risk averse personality types will respond more energetically to surprise or fear-instilling stimuli than those who are more open to change/risk.

Emotional coefficients to represent cultural or social norms

Whilst the emotions that are used at the core of the solution are universal, there is some research that shows some cultures or social groups are more/less susceptible to one or more emotions—the degree to which this factors into the scoring will be established through additional analysis as more data becomes available within the platform. In addition, there is a great deal more research that shows the ways different groups express emotions is more pronounced, and this can be taken into account when calibrating the solution.

Emotional dominance (the order in which emotions are processed by people) Not all emotions are processed by people equally; priority is given to 'survival' emotions (fear, surprise, etc.) than others. The order in which the emotions associated with Moments that Matter are processed may become significant as data over time is collected: for example, processing Anger before Joy may a have bearing on how Joy is perceived and responded to.

A calculation of 'receptivity' derived from a cartesian calculation of emotions, valence, and arousal It would be easy to form Empagraphic segments based on single emotions (all the 'happy' people, versus the 'sad' ones) but the scoring engine is built on the premise that the interplay of emotions is important. Nonetheless, many organisations would like to have a single number score that can be used as a measure of 'receptivity' (especially for sales or marketing). This can be calculated from the net product of the statistical means of 'positive' and 'negative' emotions (valence) and their intensity (arousal). The result is akin to a 'sentiment' score but offering much greater granularity and explainability. For example, both an angry person and a frightened person are both feeling 'negative emotions' but for very different reasons.

Preferably, the method of this invention will be delivered as Software/Scoring as a Service (SaaS). It can therefore be deployed in any environment that has access to Cloud infrastructure.

In use, it is of relevance to any organisation that needs to get an insight into the human motivations of behaviour. For example:

Marketing departments who want to focus different campaigns, tones of voice, or offers to different Empagraphic segments, Sales departments who want to identify which potential customers are ready to buy, or which existing customers may be in danger of defecting, HR Departments who want to know which employees may be thinking of resigning, or which are ready, willing, and able to accept more responsibilities, Market researchers who want to get a better understanding of what features/benefits customers, etc.

The present invention has been described with reference to the accompanying drawings. However, it will be appreciated that the present invention is not limited to the specific examples herein described and as illustrated in the accompanying drawings. Furthermore, because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

The invention may be implemented in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system. Therefore, some examples describe a non-transitory computer program product having executable program code stored therein for automated contouring of cone-beam CT images.

The computer program may be stored internally on a tangible and non-transitory computer readable storage medium or transmitted to the computer system via a computer readable transmission medium. All or some of the computer program may be provided on computer readable media permanently, removably or remotely coupled to an information processing system. The tangible and non-transitory computer readable media may include, for example and without limitation, any number of the following: magnetic storage media including disk and tape storage media; optical storage media such as compact disk media (e.g., CD ROM, CD R, etc.) and digital video disk storage media; non-volatile memory storage media including semiconductor-based memory units such as FLASH memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input and responds by allocating and managing tasks and internal system resources as a service to users and programs of the system.

The computer system may for instance include at least one processing unit, associated memory and several input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the scope of the invention as set forth in the appended claims and that the claims are not limited to the specific examples described above.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Any arrangement of components to achieve the same functionality is effectively 'associated' such that the desired functionality is achieved. Hence, any two components herein combined to achieve a particular functionality can be seen as 'associated with' each other such that the desired functionality is achieved, irrespective of architectures or intermediary components. Likewise, any two components so associated can also be viewed as being 'operably connected,' or 'operably coupled,' to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms 'a' or 'an' as used herein, are defined as one or more than one. Also, the use of introductory phrases such as 'at least one' and 'one or more' in the claims should not be construed to imply that the introduction of another claim element by the indefinite articles 'a' or 'an' limits any particular claim containing such introduced claim element to inventions containing only one such element, even when the same claim includes the introductory phrases 'one or more' or 'at least one' and indefinite articles such as 'a' or 'an.' The same holds true for the use of definite articles. Unless stated otherwise, terms such as 'first' and 'second' are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

I claim:

1. A computer implemented method for predicting the behaviour of one or more members of a population using predictive analytics method performed by one or more computer processor comprising the steps of:

receiving and storing in a population history database, structured and unstructured qualitative and quantitative data for one or more transactional events for one or more members of the population, where the population history database stores for each member, member identification, associated topic of qualitative and quantitative data, emotion, transactional event outcome, score and score history;

ingesting the structured and unstructured qualitative and quantitative data, including cleaning, integrating, and transforming the structured and unstructured qualitative and quantitative data to produce a structured dataset for modelling and predictive analysis;

analysing using Natural Language Processing the qualitative and quantitative transactional event data in the dataset for a transactional event encountered by at least one member of the population, to determine a topic of the qualitative and quantitative data, wherein the Natural Language processing comprises topic modelling, emotion analytics and sentiment analytics for calibration of the predictive analysis where the Natural Language Processing generates an ontology and taxonomy table, and then passes textual analyses to a behavioural analytics module, which generates a results table, and segment table, for use by the analytics module which stores predictive models;

using the behaviour analytics for identifying one or more emotions for the at least one member of the population associated with the qualitative and quantitative data;

determining using one or more computer processors a transactional event outcome for the identified emotion and associated qualitative and quantitative data using one or more predictive analytic techniques selected from correlation models, grouping models, explanatory models and predictive models;

assigning, using one or more computer processors a score for the at least one member of the population based on the transactional event outcome;

repeating the above analysing, identifying, determining and assigning steps for a plurality of transactional events for the at least one member of the population to provide updated entries for the population history database;

providing feedback from the scores about the performance of the models used for the predictive analytics to refine the models of the predictive analytic techniques;

updating the score for the at least one member of the population as the steps are repeated; and storing a score history and updated score in the population history database; and analysing the population history database and providing an output to predict the behaviour of a member of the population for new qualitative and quantitative data.

2. A computer implemented method as claimed in claim 1, where the steps of the method are repeated for a plurality of members of the population.

3. A computer implemented method as claimed in claim 1, wherein the steps of the method are repeated at a set frequency.

4. A computer implemented method as claimed in claim 3, wherein the set frequency is one of: daily, weekly, monthly, or annually.

5. A computer implemented method as claimed in claim 1, where the qualitative data is a narrative.

6. A computer implemented method as claimed in claim 1 wherein the narrative is at least one of: a written narrative or a spoken narrative.

7. A computer implemented method as claimed in claim 6, wherein the spoken narrative is received as an audio or video recording.

8. A computer implemented method as claimed in claim 1, wherein the one or more emotions is explicit from the qualitative and quantitative data.

9. A computer implemented method as claimed in claim 1, wherein the one or more emotions is implicit from the qualitative and quantitative data.

10. A computer implemented method as claimed in claim 1, further comprising obtaining metadata about the qualitative and quantitative data.

11. A computer implemented method as claimed in claim 1, wherein the one of more emotions identified are one of more of: anger, anticipation, contempt, disgust, fear, joy, love, sadness, or surprise.

12. A computer implemented method as claimed in claim 1, wherein the qualitative data is analysed to also identify a sentiment for the qualitative data.

13. A computer implemented method as claimed in claim 1, wherein, when the qualitative data from different members of the population contains common topics, the common topics are grouped for further analysis.

14. A computer implemented method as claimed in claim 1, further comprising determining an emotional profile for at least one member of the population.

15. A method as claimed in claim 14, wherein the emotional profile is determined for a plurality of members of the population.

16. A computer implemented method according to claim 1, wherein the steps are performed using cloud computing infrastructure.

17. A computer implemented method according to claim 1, further comprising the step of determining an increase or decrease of at least one specified emotion over a defined time period.

18. A computer implemented method as claimed in claim 17, wherein the time period is between 1 day to 90 days.

19. A computer implemented method as claimed in claim 1, further comprising the step of determining the time period over which a subject will revert to a baseline emotional state.

20. A computer implemented method as claimed in claim 1, further comprising the step of calculating a coefficient of emotional gain, which determines absolute changes in an arousal level of a subject.

* * * * *